UNITED STATES PATENT OFFICE.

JOSEPH BRUCE MILLER, OF INDIANAPOLIS, INDIANA.

FIRE-EXTINGUISHING COMPOSITION AND PROCESS OF PREPARING SAME.

1,421,527.  Specification of Letters Patent.  Patented July 4, 1922.

No Drawing.  Application filed February 4, 1922.  Serial No. 534,192.

*To all whom it may concern:*

Be it known that I, JOSEPH BRUCE MILLER, a citizen of the United States, residing in the city of Indianapolis, in the county of Marion, State of Indiana, have invented a new Fire-Extinguishing Composition and Process of Preparing Same, of which the following is a full, clear, and comprehensive specification and exposition, being such as will enable others to make and use the same with exactitude.

The object of my present invention is to provide a fire extinguishing composition which when placed upon or in a fire will at once develop a gas which will instantly smother the fire and cause it to be extinguished. And a further object is to provide a process for the preparation of said composition.

A further object is to provide a fire extinguishing composition and process of preparing same which is simple in character, positive in action, not deleterious to health or to goods with which it may come in contact, easily prepared and handled, and which can be manufactured and sold at a comparatively low price.

My composition consists essentially of the following chemical constituents: sodium bicarbonate, hydrated lime, silica sand, sulphuric acid, hydrochloric acid, and rock salt.

The said elements are to be employed in substantially the following proportions: sodium bicarbonate twenty-five parts, hydrated lime three parts, silica sand four parts, sulphuric acid two parts, hydrochloric acid one part, and rock salt three parts.

The sodium bicarbonate and hydrated lime are first mixed together and reduced to a very fine powder or flour. The silica sand should be of the finest quality. The sulphuric acid and the hydrochloric acid are in concentrated form. And the rock salt is reduced to a fine powder before being combined with the other elements.

All of the above named elements are to be thoroughly mixed together and again comminuted and agitated as a whole, the sulphuric acid and the hydrochloric acid being added gradually while the other elements are being agitated.

After all of the said elements have been thoroughly commingled the composition should then be subjected to heat of a degree such as to drive off all moisture which may have been absorbed, and the applied heat should be continued for a considerable time, during which the composition should be agitated.

After the above the composition is permitted to cool, after which it is placed in tubular containers which are air tight and impervious to moisture.

Then the container is broken and the composition is thrown upon the fire the heat will cause the composition to be converted into a non-combustible gas which will instantly quench the fire, thereby accomplishing the desideratum of this invention.

I desire that it be understood that various changes may be made in the detail of the composition and in the manner of its preparation without departing from the spirit of the invention and without sacrificing any of the advantages thereof.

Having now fully shown and described my invention what I claim and desire to secure by Letters Patent of the United States, is—

1. A fire extinguishing composition resulting from the mixture of sodium bicarbonate, hydrated lime, silica sand, sulphuric acid, hydrochloric acid, and rock salt, all combined substantially as set forth.

2. A fire extinguishing composition comprising a combination of chemical elements producing, after chemical reaction with each other, calcium sulphate, sodium chloride, and sodium sulphate, intermixed with surplus of hydrated lime, sodium bicarbonate, silica, and rock salt, all inter-mixed and in powder form, substantially as set forth.

3. The herein described process which consists in reducing sodium bicarbonate and hydrated lime to a fine flour, adding thereto a fine quality of silica, reducing rock salt to a powder and then adding it to the previously mentioned ingredients, then adding to the whole sulphuric acid and hydrochloric acid in concentrated form, then subjecting all to heat, at the same time keeping all in agitation, allowing the composition to cool, and then placing the resultant composition in tubular containers, all substantially as set forth.

JOSEPH BRUCE MILLER.